(12) United States Patent
Niino

(10) Patent No.: US 7,694,176 B2
(45) Date of Patent: Apr. 6, 2010

(54) FAULT-TOLERANT COMPUTER AND METHOD OF CONTROLLING SAME

(75) Inventor: Ryuta Niino, Tokyo (JP)

(73) Assignee: NEC Corporation, Tokyo (JP)

( * ) Notice: Subject to any disclaimer, the term of this patent is extended or adjusted under 35 U.S.C. 154(b) by 587 days.

(21) Appl. No.: 11/305,122

(22) Filed: Dec. 19, 2005

(65) Prior Publication Data

US 2006/0156061 A1 Jul. 13, 2006

(30) Foreign Application Priority Data

Dec. 21, 2004 (JP) ............................ 2004-369388

(51) Int. Cl.
*G06F 11/00* (2006.01)

(52) U.S. Cl. ........................................ 714/12
(58) Field of Classification Search .................. 714/56, 714/12
See application file for complete search history.

(56) References Cited

U.S. PATENT DOCUMENTS

| | | | |
|---|---|---|---|
| 5,812,534 A * | 9/1998 | Davis et al. | 370/260 |
| 5,943,383 A | 8/1999 | Hubl | |
| 6,577,649 B1 * | 6/2003 | Leibowitz et al. | 370/503 |
| 2001/0025352 A1 | 9/2001 | Ghameshlu et al. | |
| 2002/0144177 A1 * | 10/2002 | Kondo et al. | 714/13 |
| 2003/0093570 A1 * | 5/2003 | Bissett | 709/248 |
| 2004/0208130 A1 * | 10/2004 | Mizutani et al. | 370/242 |
| 2005/0033862 A1 | 2/2005 | Blum et al. | |
| 2006/0222126 A1 * | 10/2006 | Edwards et al. | 375/354 |

FOREIGN PATENT DOCUMENTS

| | | |
|---|---|---|
| DE | 102 29 110 | 4/2003 |
| JP | 9-200239 | 7/1997 |
| JP | 10-177498 | 6/1998 |
| JP | 2003-242130 | 8/2003 |
| JP | 2004-110803 | 4/2004 |
| JP | 2004-326151 | 11/2004 |

* cited by examiner

*Primary Examiner*—Scott T Baderman
*Assistant Examiner*—Yair Leibovich
(74) *Attorney, Agent, or Firm*—Young & Thompson

(57) ABSTRACT

A fault-tolerant computer has duplex systems each comprising a CPU subsystem for controlling access to a CPU and a storage unit, and an IO subsystem for controlling data which are input to the IO subsystem from an external circuit and output from the IO subsystem to the external circuit. Data with a transmission time assigned thereto is transmitted from one of the IO subsystems to the other IO subsystem, and is received asynchronously by the other IO subsystem. The other IO subsystem records a reception time of the data, and calculates an ideal reception time using the transmission time assigned to the data. A clock shift in the other IO subsystem with respect to the one IO subsystem is calculated from the calculated ideal reception time and the recorded reception time. Thereafter, the counter in the other IO subsystem is changed based on the calculated clock shift, and data is received using the changed counter.

3 Claims, 8 Drawing Sheets

FAULT-TOLERANT COMPUTER AND METHOD OF CONTROLLING SAME

BACKGROUND OF THE INVENTION

1. Field of the Invention

The present invention relates to a fault-tolerant computer with duplex systems and a method of controlling such a fault-tolerant computer.

2. Description of the Related Art

In recent years, growing computer functionality has enabled computers to be used in a wider variety of fields. Such computers are required to operate continuously even in the event of faults. One solution to meet the requirement is fault-tolerant technology as disclosed in Japanese laid-open patent publication No. 1998-177498, for example.

A fault-tolerant computer built on the fault-tolerant technology has duplex systems each including a CPU subsystem and an IO subsystem. The fault-tolerant computer detects the occurrence of a fault by comparing the duplex systems to ascertain whether the systems are operating in synchronism with each other or not.

Fault-tolerant computers with duplex systems employs a lock-step system for operating the two CPU subsystems synchronously with each other based on a common internal clock. Some fault-tolerant computers have a high-speed interface for communications between the two IO subsystems, the interface employing a serial link that operates out of synchronism with the internal clock. When one of the IO subsystems accesses the two CPU subsystems of those fault-tolerant computers, one of the CPU subsystems is accessed only through an internal path, whereas the other CPU subsystem is accessed through the high-speed interface. In order to gain synchronous access to the two CPU subsystems, therefore, the internal clock and the clock of the high-speed interface need to be synchronized with each other.

It has been customary to achieve synchronized communication timing between the CPU subsystems and the IO subsystems of the duplex systems by replacing the clock of the high-speed interface with the internal clock at a given time within certain cyclic periods.

However, the fault-tolerant computers have suffered a problem in that though the two systems operate based on the same clock, they tend to be shifted out of phase with each other due to a skew on clock lines and characteristics of PLLs in the systems. The problem has led to another disadvantage in that there are statically indefinite parameters exist in the receiving system.

Since the internal clock for operating the systems and the clock of the high-speed interface are different from each other, synchronism is achieved using a gearing generated from a global counter. However, unless the global counter and other component are stable, no gearing can be generated, and the receiving system has to perform data communications out of synchronism until a gearing is generated.

SUMMARY OF THE INVENTION

It is therefore an object of the present invention to provide a fault-tolerant computer which is capable of reliably achieving synchronism between duplex systems and synchronizing the duplex systems even if counters thereof are operating independently of each other, and a method of controlling such a fault-tolerant computer.

According to the present invention, a fault-tolerant computer has duplex systems each comprising a CPU subsystem for controlling access to a CPU and a storage unit, and an IO subsystem for controlling data which are input to the IO subsystem from an external circuit and output from the IO subsystem to the external circuit. Data with a transmission time assigned thereto is transmitted from one of the IO subsystems to the other IO subsystem, and is received asynchronously by the other IO subsystem. The other IO subsystem records a reception time of the data, and calculates an ideal reception time using the transmission time assigned to the data. A clock shift in the other IO subsystem with respect to the one IO subsystem is calculated from the calculated ideal reception time and the recorded reception time. Thereafter, the counter in the other IO subsystem is changed based on the calculated clock shift, and data is received using the changed counter.

As described above, a transmission time is assigned to data transmitted between the duplex systems, and an ideal reception time is calculated from the transmission time. A clock shift is calculated from the ideal reception time and an actual reception time, and the clock is changed based on the calculated clock shift. Therefore, the duplex systems can reliably be synchronized with each other. The duplex systems can be synchronized with each other even if counters of the systems are operating independently of each other.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
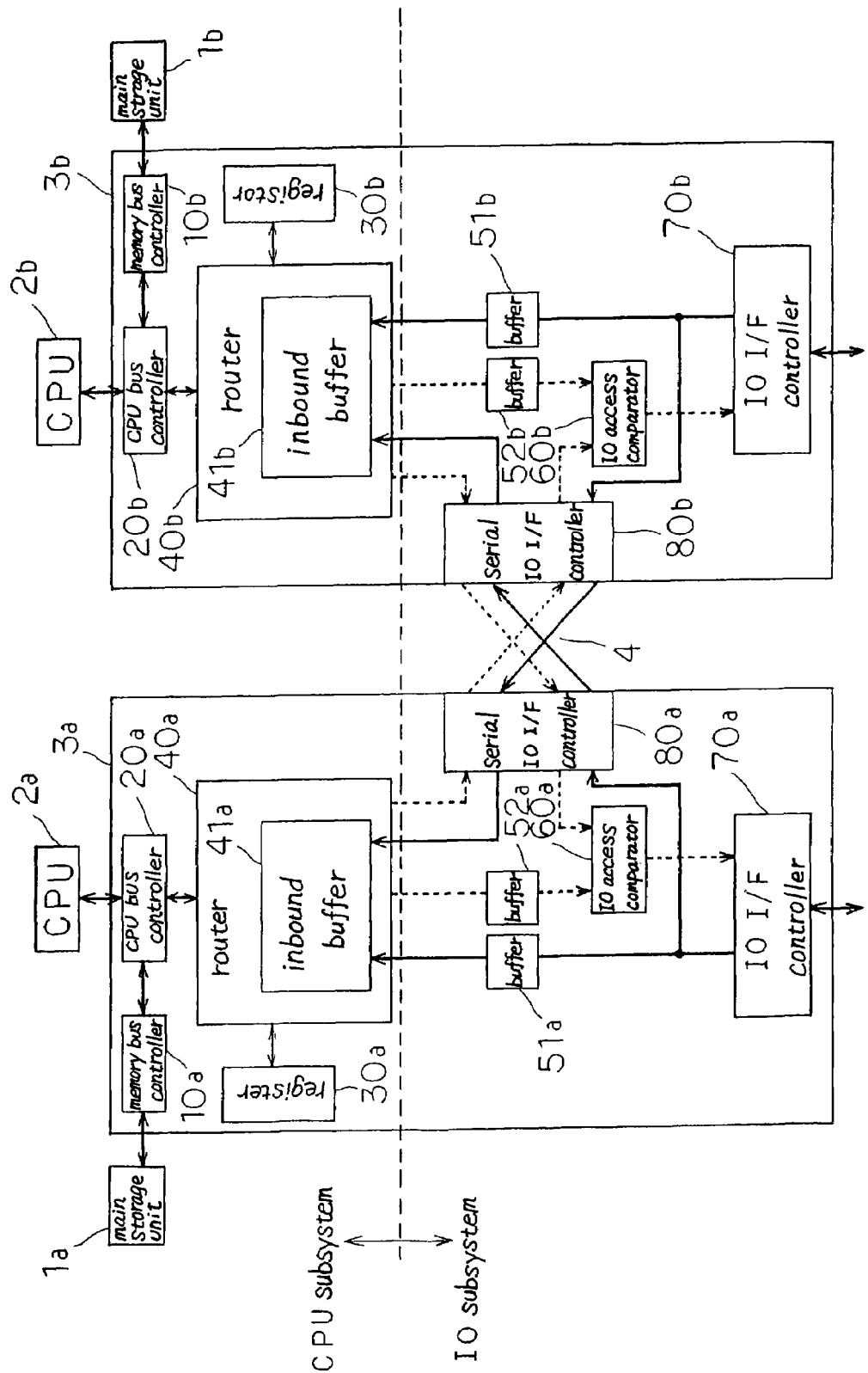
FIG. 1 is a block diagram of a fault-tolerant computer according to an embodiment of the present invention.

FIG. 1 shows in block form a fault-tolerant computer according to an embodiment of the present invention.

As shown in FIG. 1, the fault-tolerant computer has a pair of duplex systems including a pair of main storage units 1a, 1b, a pair of CPUs 2a, 2b, and a pair of systems 3a, 3b for accessing main storage units 1a, 1b and CPUs 2a, 2b. System 3a, 3b are connected to each other by cross link 4. Systems 3a, 3b have respective IO I/F controllers 70a, 70b for controlling data as they are input to and output from external circuits, respective buffers 51a, 51b for temporarily storing data that are transferred from IO I/F controllers 70a, 70b to CPUs 2a, 2b, respective buffers 52a, 52b for temporarily storing data that are transmitted from CPUs 2a, 2b to IO I/F controllers 70a, 70b, respective serial IO I/F controllers 80a, 80b for controlling the transfer of data between systems 3a, 3b through cross link 4, and respective IO access comparators 60a, 60b for comparing access from CPUs 2a, 2b to IO I/F controllers 70a, 70b and access from other systems 3a, 3b to IO I/F controllers 70a, 70b via serial IO I/F controllers 80a, 80b with each other. These components of systems 3a, 3b are referred to as IO subsystems, and operate based on a clock using gearing counters of respective systems 3a, 3b. Systems 3a, 3b also have respective memory bus controllers 10a, 10b for controlling data as they are written into and read from main storage units 1a, 1b, respective CPU bus controllers 20a, 20b for controlling access to CPUs 2a, 2b, respective registers 30a, 30b, and respective routers 40a, 40b including respective inbound buffers 41a, 41b, for switching access control between CPU bus controllers 20a, 20b, registers 30a, 30b, buffers 51a, 51b, 52a, 52b, and serial IO I/F controllers 80a, 80b. These components of systems 3a, 3b are referred to as CPU subsystems, and operate synchronously based on a common internal clock according to a lock-step system.

The fault-tolerant computer thus constructed operates as follows: Access from CPUs 2a, 2b to IO I/F controllers 70a, 70b and access from other systems 3a, 3b to IO I/F controllers 70a, 70b via serial IO I/F controllers 80a, 80b are compared with each other by IO access comparators 60a, 60b. A fault of systems 3a, 3b is detected based on the compared access. The clock of cross link 4 is replaced with the internal clock of the CPU subsystems at a given time within certain cyclic periods for thereby synchronizing communication timing between the CPU subsystems and IO subsystems. Systems 3a, 3b tend to be shifted out of phase with each other due to a skew on clock lines from a clock source which generates a core clock as the internal clock, and characteristics of PLLs in systems 3a, 3b. However, serial IO I/F controllers 80a, 80b achieve synchronism between systems 3a, 3b. Details of serial IO I/F controllers 80a, 80b and their operation will be described below.

Figure 2:
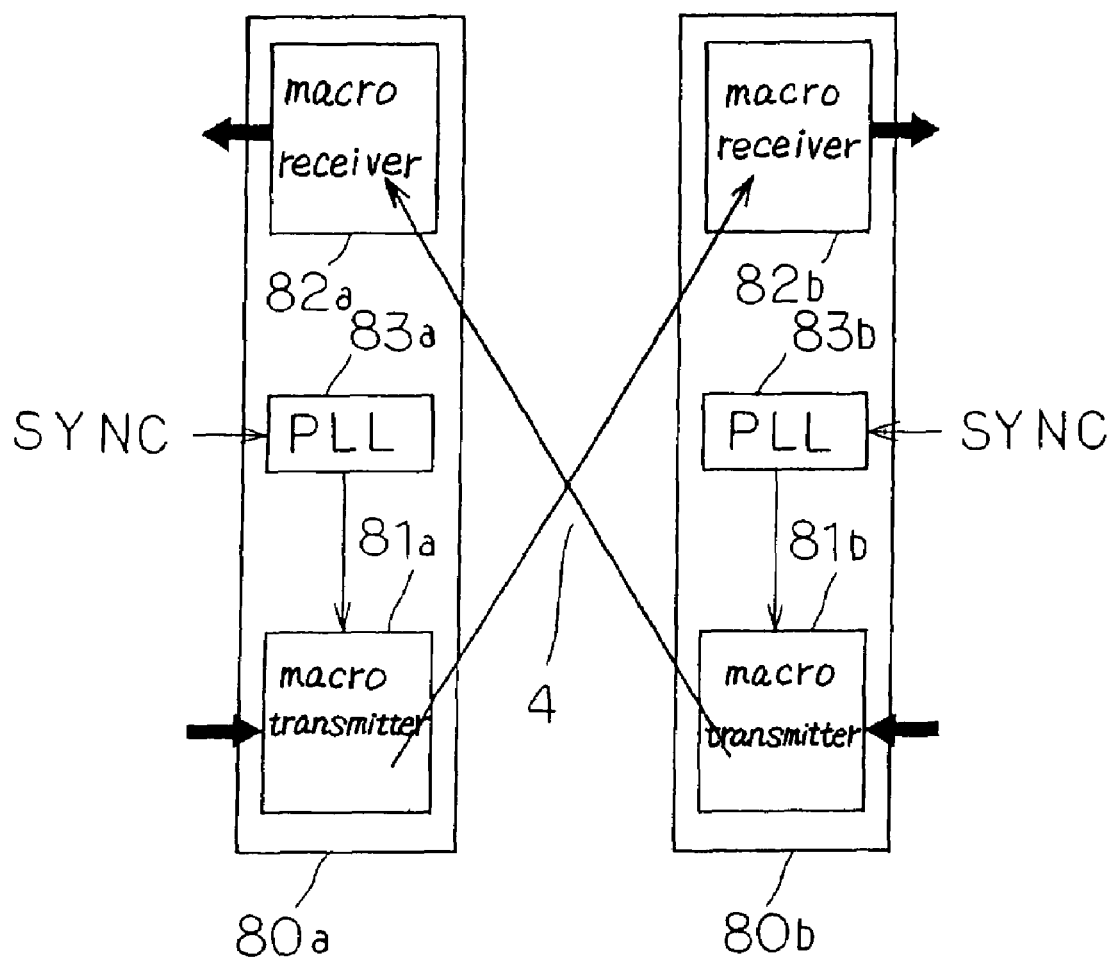
FIG. 2 is a block diagram of serial IO I/F controllers shown in FIG. 1.

FIG. 2 shows in block diagram serial IO I/F controllers 80a, 80b shown in FIG. 1.

As shown in FIG. 2, serial IO I/F controllers 80a, 80b have respective macro transmitters 81a, 81b for transmitting access data representing access from IO I/F controllers 70a, 70b to systems 3a, 3b, respective macro receivers 82a, 82b for receiving, through cross link 4, access data transmitted from macro transmitters 81a, 81b of other systems 3a, 3b, and PLLs 83a, 83b for generating an operating clock for macro transmitters 81a, 81b using the core clock and gearing registers in systems 3a, 3b. When macro transmitters 81a, 81b are to transmit access data, they embed a counter value at the time of transmission into a packet of the access data, and then transmit the access data. When macro receivers 82a, 82b have received the packet of the access data, they record a counter value at the time of reception and a counter value, as a reception time, at the data extraction timing in one cyclic period of a gearing counter that is used to synchronize at least systems 3a, 3b, with the packet at the leading end.

A method of controlling the fault-tolerant computer thus constructed to transmit a packet from system 3a to system 3b and change the gearing counter in system 3b for thereby synchronizing systems 3a, 3b with each other will be described below.

Figure 3:
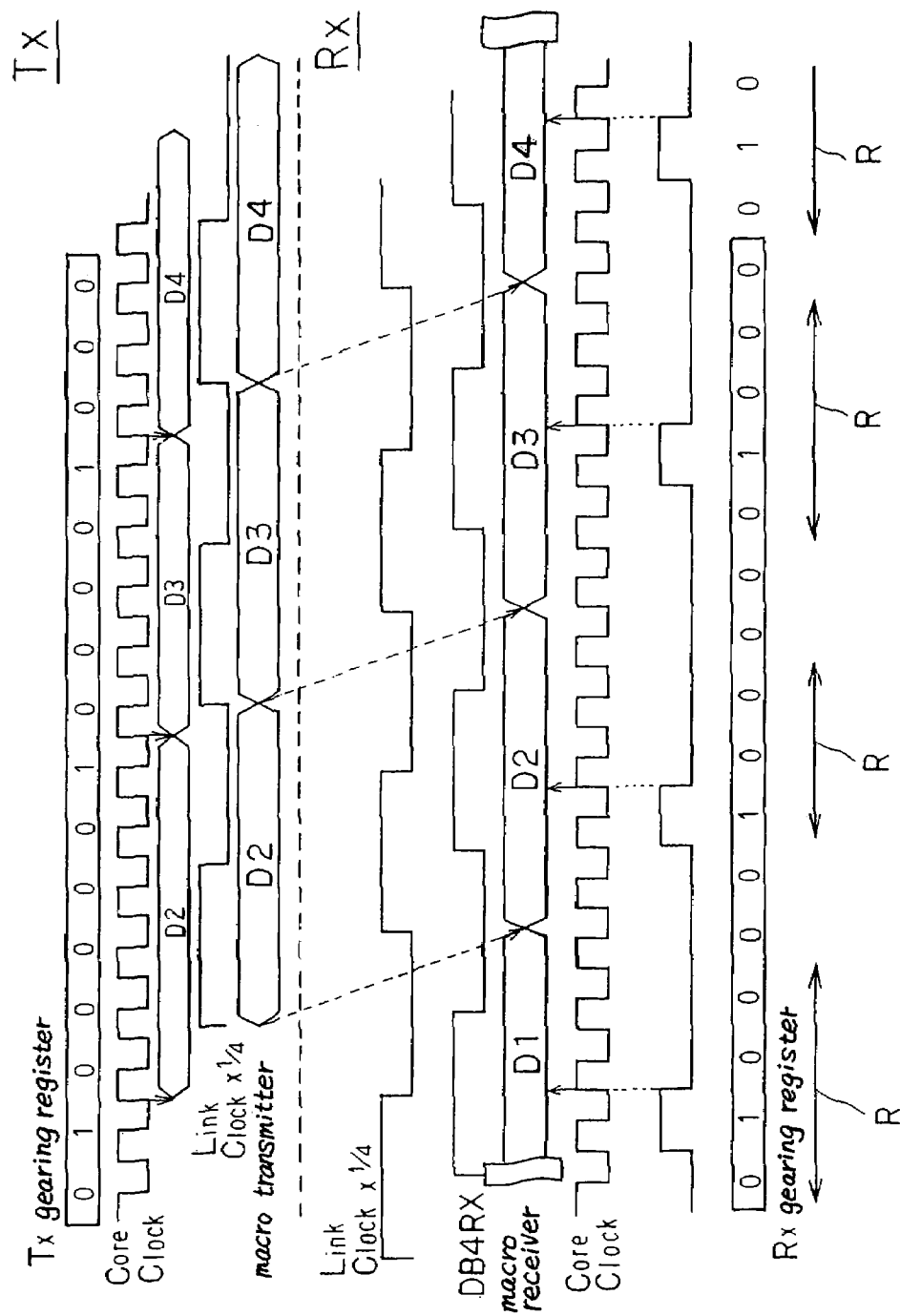
FIG. 3 is a timing chart illustrative of operation of the fault-tolerant computer shown in FIGS. 1 and 2.
Figure 4:
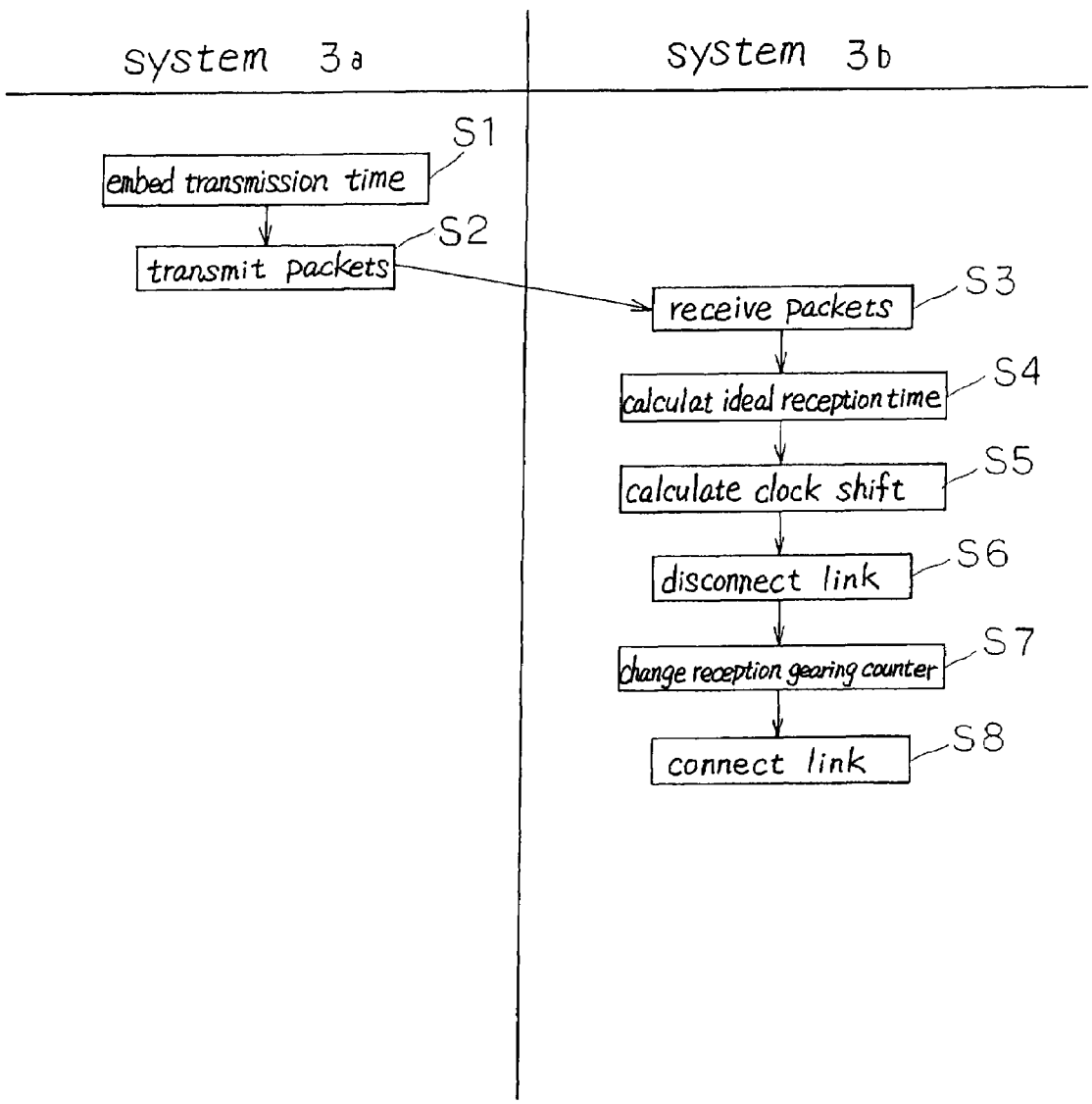
FIG. 4 is a flowchart of a process in a first phase of a method of controlling the fault-tolerant computer shown in FIGS. 1 and 2.

FIG. 3 is a timing chart illustrative of operation of the fault-tolerant computer shown in FIGS. 1 and 2, and FIG. 4 is a flowchart of a process in a first phase of a method of controlling the fault-tolerant computer shown in FIGS. 1 and 2.

In system 3a, packets D2 through D4 are transferred from the CPU subsystem to macro transmitter 81a based on the core clock and the transmission gearing register in system 3a. In the present embodiment, the gearing register in each of systems 3a, 3b is set such that it has one cyclic period composed of 16 clock pulses of the core clock as the internal clock, and three packets are accommodated in such one cyclic period. Specifically, the gearing register in each of systems 3a, 3b serves to determine timing in one cyclic period. On the transmission side, data is transferred to macro transmitters 81a, 81b at the timing when the gearing register is set to "1", and on the reception side, data is transferred from macro receivers 82a, 82b at the timing when the gearing register is set to "1". Since the gearing register determines timing in one cyclic period that is composed of 16 clock pulses of the core clock, the cyclic period determined by the gear register represents an integral multiple of the core clock. Furthermore, inasmuch as the clock of cross link 4 is generated from the core clock and the gearing register, the cyclic period determined by the gear register also represents an integral multiple of the clock of cross link 4.

In step 1 shown in FIG. 4, transmission time C1a from macro transmitter 81a is embedded in each of packets D2 through D4 transferred to macro transmitter 81a. In step 2, packets D2 through D4 are transmitted at a timing based on an operating clock generated by PLL 83a. At this time, the gearing counters in systems 3a, 3b operate independently of each other, and systems 3a, 3b receive the packets in an asynchronous mode. PLL 83a generates the operating clock for macro transmitter 81a using the core clock and the transmission gearing register in system 3a.

Packets D2 through D4 transmitted from macro transmitter 81a are received by macro receiver 82b of system 3b through cross link 4 in step 3. At this time, reception time C2b of packet D2 is recorded.

In step 4, macro receiver 82b calculates ideal reception time C2a according to the equation (1) shown below, from transmission time C1a embedded in received packet D2, flight time Tfp between systems 3a, 3b, and difference Dif between an asynchronous process and a synchronous process. Flight time Tfp between systems 3a, 3b refers to a time required to transfer data therebetween while systems 3a, 3b are operating in the synchronous mode, and is preset by systems 3a, 3b.

$$C2a = C1a + Tfp - Dif \quad (1)$$

In step 5, actual packet reception time C2b is subtracted from calculated ideal reception time C2a, thereby calculating a clock shift.

In step 6, cross link 4 is temporarily disconnected. In step 7, the reception gearing counter in macro receiver 82b is changed depending on the clock shift calculated in step 5.

Figure 5:
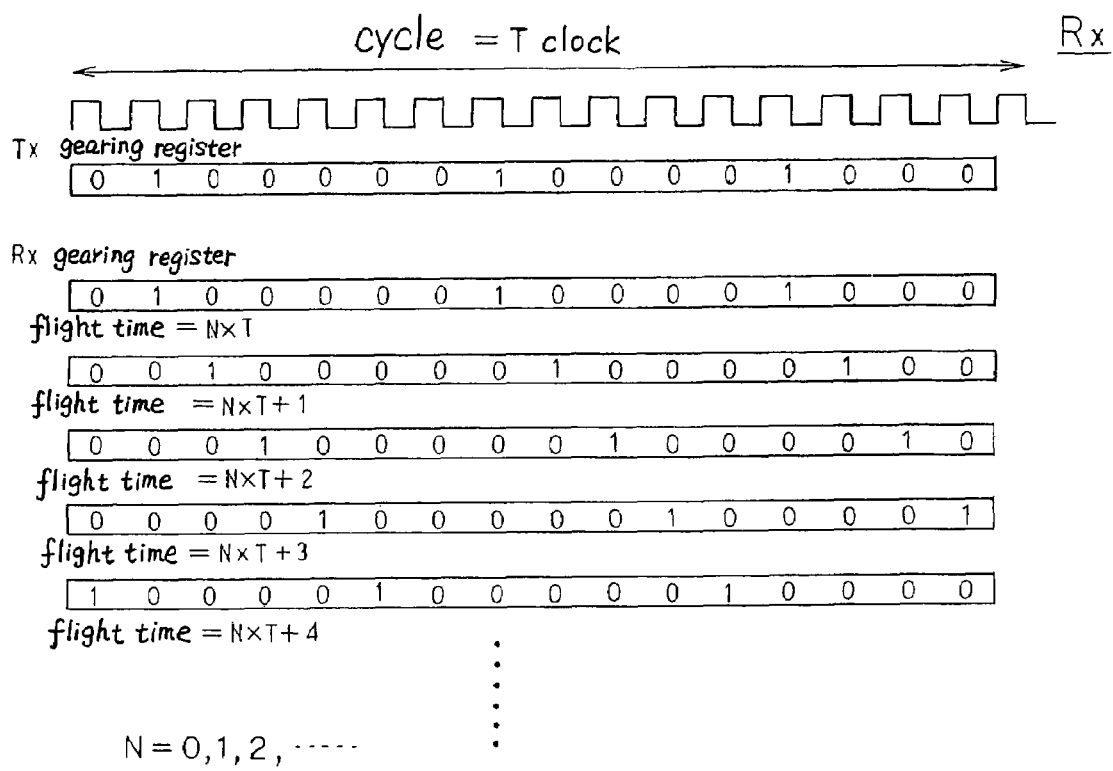
FIG. 5 is a diagram illustrative of a process of changing a gearing counter in the fault-tolerant computer shown in FIGS. 1 and 2.

FIG. 5 is a diagram illustrative of a process of changing a gearing counter in the fault-tolerant computer shown in FIGS. 1 and 2.

As shown in FIG. 5, the reception gearing counter in macro receiver 82b which receives packets is determined from the transmission gearing counter in macro transmitter 81a which transmits packets and the flight time. The reception gearing counter is shifted a number of clock pulses depending on the clock shift calculated in step 5.

When the reception gearing counter in macro receiver 82b changed, cross link 4 is connected again in step 8. Macro receiver 82b receives packets in a gearing mode based on the changed reception gearing counter.

Figure 6:
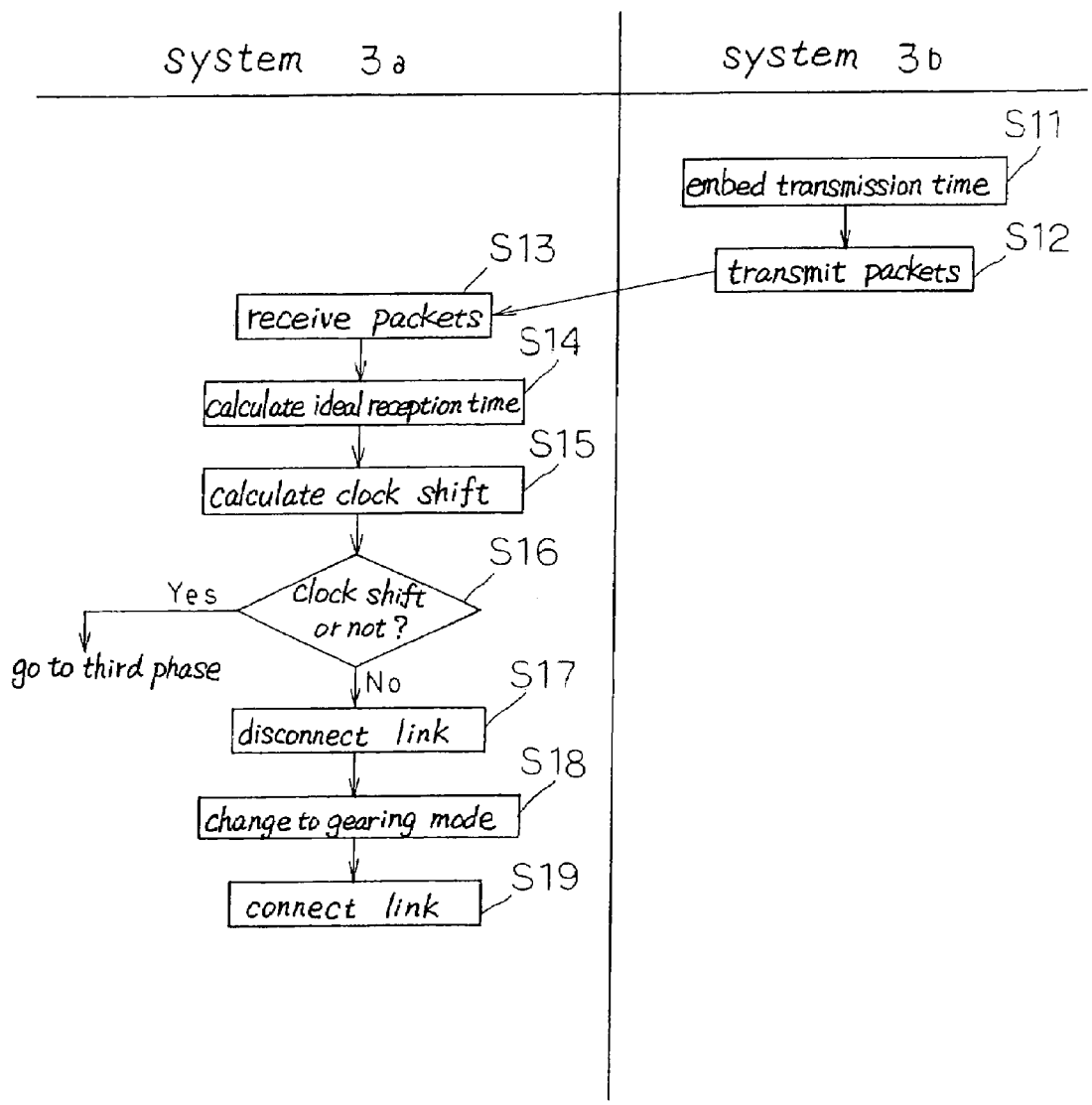
FIG. 6 is a flowchart of a process in a second phase of the method of controlling the fault-tolerant computer shown in FIGS. 1 and 2.

FIG. 6 is a flowchart of a process in a second phase of the method of controlling the fault-tolerant computer shown in FIGS. 1 and 2.

In the second phase, macro receiver 82b receives packets in the gearing mode, and macro receiver 82a receives packets in the asynchronous mode.

In step 11, transmission time C3b from macro transmitter 81b is embedded in a packet to be transmitted to system 3a by macro transmitter 81b. In step 12, the packet is transmitted at a timing based on the transmission gearing counter.

The packet transmitted from macro transmitter 81b is received by macro receiver 82a of system 3a through cross link 4 in step 13. At this time, reception time C4b of the received packet is recorded. The packet is received by macro receiver 82a in the asynchronous mode.

In step 14, macro receiver 82a calculates ideal reception time C4a according to the equation (2) shown below, from transmission time C3b embedded in the received packet, flight time Tfp in system 3a, and difference Dif between the asynchronous process and the synchronous process.

$$C4a = C3b + Tfp - Dif \quad (2)$$

In step 15, calculated ideal reception time C4a is subtracted from actual packet reception time C4b, thereby calculating a clock shift. In step 16, it is determined whether there is a clock shift or not. If it is judged that there is no clock shift, then cross link 4 is temporarily disconnected in step 17. In step 18, macro receiver 82a is changed to the gearing mode. Thereafter, cross link 4 is connected again in step 19.

If it is judged that there is a clock shift in step 15, then the control method goes to a third phase as described below.

Figure 7:
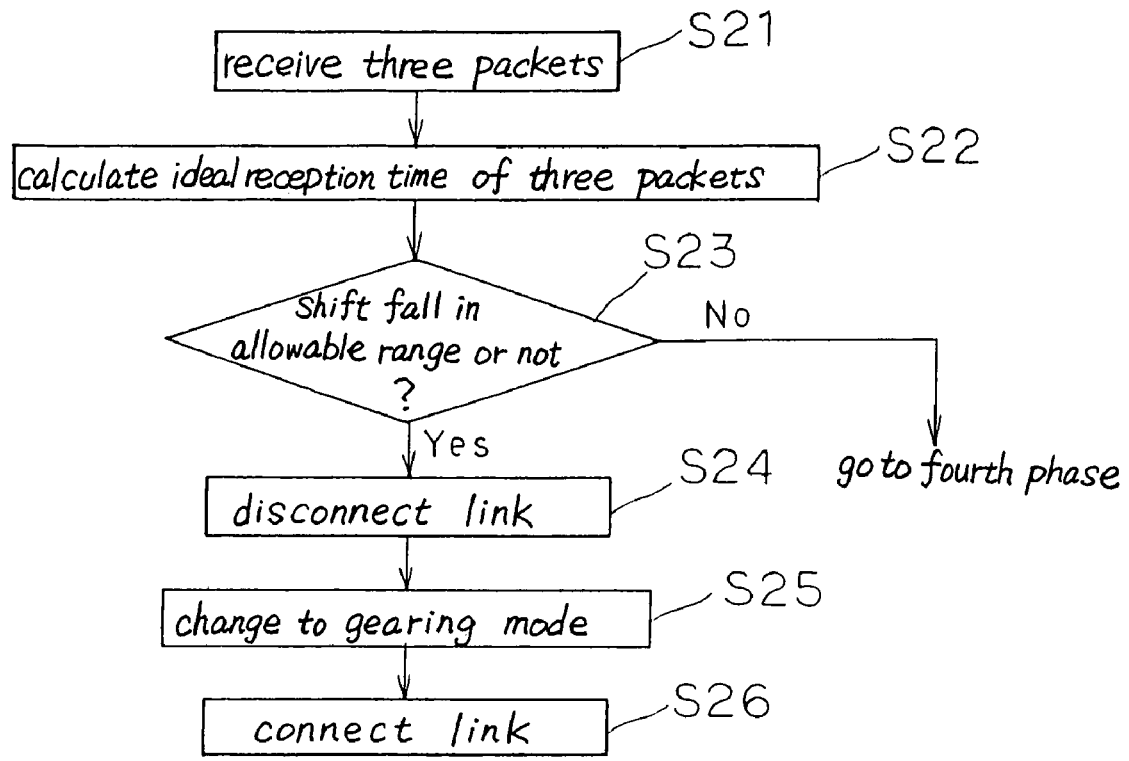
FIG. 7 is a flowchart of a process in a third phase of the method of controlling the fault-tolerant computer shown in FIGS. 1 and 2.

FIG. 7 is a flowchart of a process in a third phase of the method of controlling the fault-tolerant computer shown in FIGS. 1 and 2.

If it is judged that there is a clock shift in step 15 shown in FIG. 6, macro receiver 82a receives packets in one cyclic period in step 21. In step 22, ideal reception times of the received packets are calculated in the same manner as described above. In the present embodiment, the gearing registers in each of systems 3a, 3b is set such that it has one cyclic period composed of 16 clock pulses, and three packets are accommodated in such one cyclic period. Therefore, macro receiver 82a receives three successive packets in one cyclic period. Transmission times C8b, C9b, C10b of the three packets from macro transmitter 81b can be calculated from transmission time C8b embedded in the leading packet and the transmission gearing register in macro transmitter 81b. Ideal reception times C5b, C6b, C7b of the three packets are calculated according to the following equations (3) through (5):

$$C5b = C8b + Tfp - Dif \quad (3)$$

$$C6b = C9b + Tfp - Dif \quad (4)$$

$$C7b = C10b + Tfp - Dif \quad (5)$$

In step 23, it is determined whether a shift between the gearing counter in system 3a and the gearing counter in system 3b falls in an allowable range or not, based on calculated ideal reception times C5b, C6b, C7b and actual reception times C5a, C6a, C7a of the three packets in macro receiver 82a.

As shown in FIG. 3, the allowable range R for gearing counter shifts is a range which allows data to be extracted if the gearing counter shifts in the allowable range R. The allowable range R is determined in advance and set as a table.

If it is judged that the gearing counter shift is in the allowable range R, then cross link 4 is temporarily disconnected in step 24. In step 25, macro receiver 82a is changed to the gearing mode. Thereafter, cross link 4 is connected again in step 26.

If it is judged that the gearing counter shift falls outside of the allowable range R, then the control method goes to a fourth phase as described below. If it is judged that the gearing counter shift is in the allowable range R and is significantly large, then the control method also goes to the fourth phase.

Figure 8:
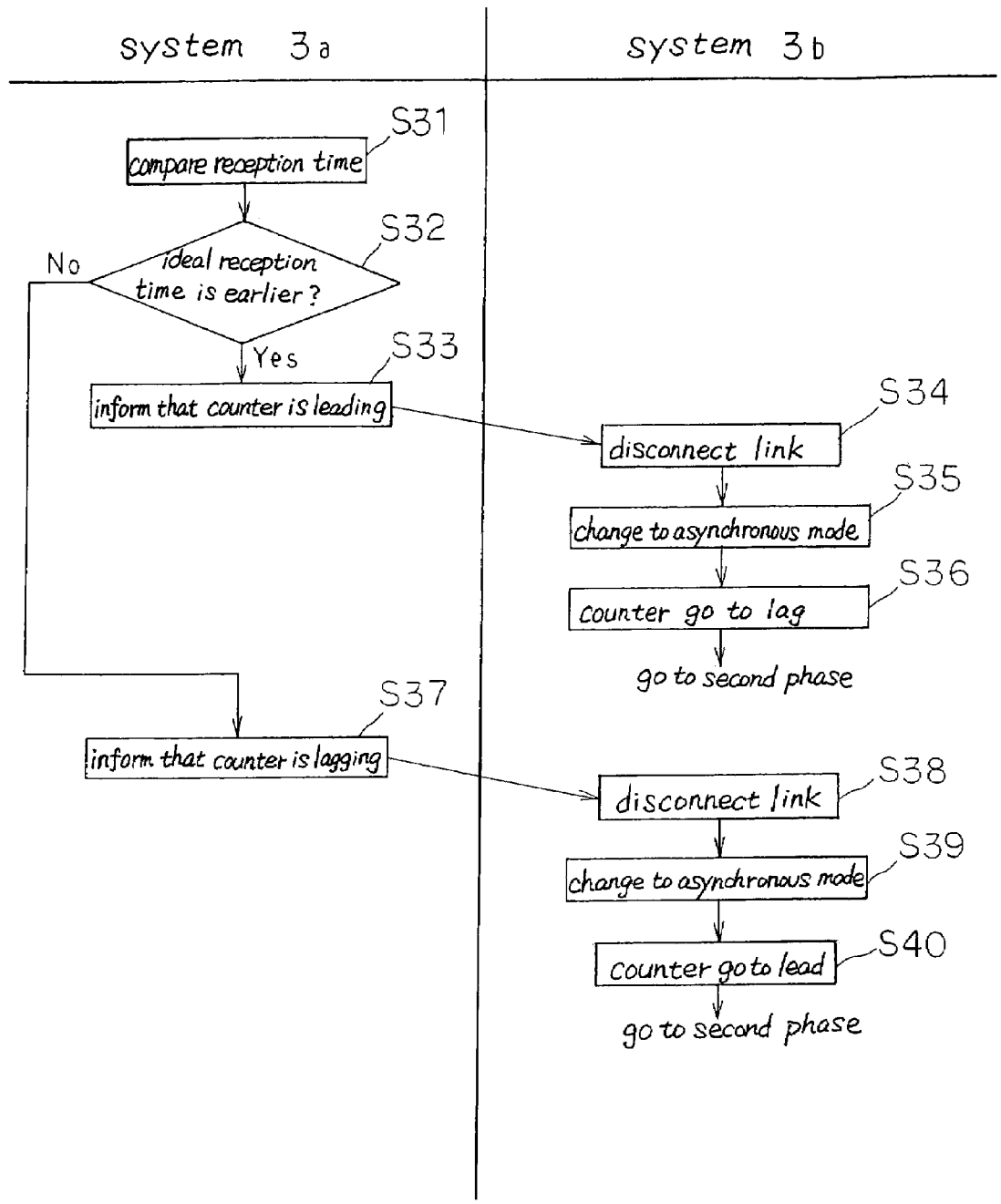
FIG. 8 is a flowchart of a process in a fourth phase of the method of controlling the fault-tolerant computer shown in FIGS. 1 and 2.

FIG. 8 is a flowchart of a process in a fourth phase of the method of controlling the fault-tolerant computer shown in FIGS. 1 and 2.

If it is judged that the gearing counter shift falls outside of the allowable range R, macro receiver 82a compares actual reception time C5a and ideal reception time C5b with each other in step 31.

If it is judged in step 32 that ideal reception time C5b is earlier than actual reception time C5a, then it is judged that the counter of system 3b is leading, and information representing that the counter in system 3b is leading is transmitted to system 3b in step 33.

Then, in step 34, serial IO I/F controller 80b of system 3b disconnects cross link 4. In step 35, the reception by macro receiver 82b is changed to the asynchronous mode.

Thereafter, in step 36, the gearing counter in system 3b is changed so as to lag. The gearing counter in system 3b is changed within the allowable range of shifts of the reception gearing counter. Consequently, the successive packets are transmitted in the third phase from macro transmitter 81a to macro receiver 82b, and an allowable range in one cyclic period is calculated.

Then, the control method goes to the second phase for counter synchronization.

If it is judged in step 32 that ideal reception time C5b is later than actual reception time C5a, then it is judged that the counter of system 3b is lagging, and information representing that the counter in system 3b is lagging is transmitted to system 3b in step 37.

Then, in step 38, serial IO I/F controller 80b of system 3b disconnects cross link 4. In step 39, the reception by macro receiver 82b is changed to the asynchronous mode.

Thereafter, in step 40, the gearing counter in system 3b is changed so as to lead.

In the present embodiment, the allowable range R for gearing counter shifts is determined in advance and set as a table. However, the allowable range R may dynamically be determined upon transmission and reception of packets.

While a preferred embodiment of the present invention has been described using specific terms, such description is for illustrative purposes only, and it is to be understood that changes and variations may be made without departing from the spirit or scope of the following claims.

What is claimed is:

1. A fault-tolerant computer comprising:
   duplex systems;
   each of said duplex systems comprising:
   a CPU subsystem operable based on a common clock of said duplex systems, for controlling access to a CPU and a storage unit; and
   an IO subsystem operable either asynchronously or based on a clock of a counter in the IO subsystem, for controlling data which are input to said CPU subsystem from an external circuit and output from said CPU subsystem to the external circuit;
   said IO subsystem comprising:
   transmitting means for assigning a transmission time to data to be transmitted to a paired IO subsystem and transmitting the data to the paired IO subsystem; and receiving means for asynchronously receiving data transmitted from the paired IO subsystem and recording a reception time of the received data;

wherein a clock shift with respect to the paired IO subsystem is calculated from an ideal reception time calculated using the transmission time assigned to the data to be transmitted and the reception time recorded by said receiving means, the counter in the IO subsystem is changed based on the calculated clock shift, and data is received using the changed counter, wherein said IO subsystem calculates said clock shift with respect to each of data in one cyclic period of at least said counter, and the counter in the IO subsystem is changed to keep the calculated clock shift in a predetermined allowable range, wherein said common clock of said duplex systems is separate from said clock of a counter in the IO subsystem.

2. A method of controlling a fault tolerant computer having duplex systems each comprising a CPU subsystem for controlling access to a CPU and a storage unit, and an IO subsystem for controlling data which are input to said CPU subsystem from an external circuit and output from said CPU subsystem to the external circuit, said CPU subsystem being operable based on a common clock of said duplex systems, and said IO subsystem being operable either asynchronously or based on a clock of a counter in the IO subsystem, for controlling data which are input to said CPU subsystem and output from said CPU subsystem, said method comprising the steps of:

transmitting data with a transmission time assigned thereto from one of the IO subsystems to the other IO subsystem;

receiving the data transmitted from said one IO subsystem, asynchronously with said other IO subsystem;

recording a reception time of said data in said other IO subsystem;

calculating an ideal reception time using the transmission time assigned to the data received by said other IO subsystem;

calculating a clock shift in said other IO subsystem with respect to said one IO subsystem from said ideal reception time and the reception time recorded by said other IO subsystem;

changing the counter in said other IO subsystem based on the calculated clock shift;

receiving data using said counter with said other IO subsystem; and calculating said clock shift with respect to each of data in one cyclic period of at least said counter; and changing the counter in said other IO subsystem to keep the calculated clock shift in a predetermined allowable range, wherein said common clock of said duplex systems is separate from said clock of a counter in the IO subsystem.

3. The fault-tolerant computer according to claim 1, wherein said transmission means and said receiving means of a each of said IO subsystems of said duplex systems forms a crosslink, said transmitting means transmitting directly to said receiving means.

* * * * *